Nov. 7, 1972   K. A. FARRUGIE   3,702,210
FOWL CARRIER

Filed Aug. 3, 1971   3 Sheets-Sheet 1

Nov. 7, 1972  K. A. FARRUGIE  3,702,210
FOWL CARRIER
Filed Aug. 3, 1971  3 Sheets-Sheet 2
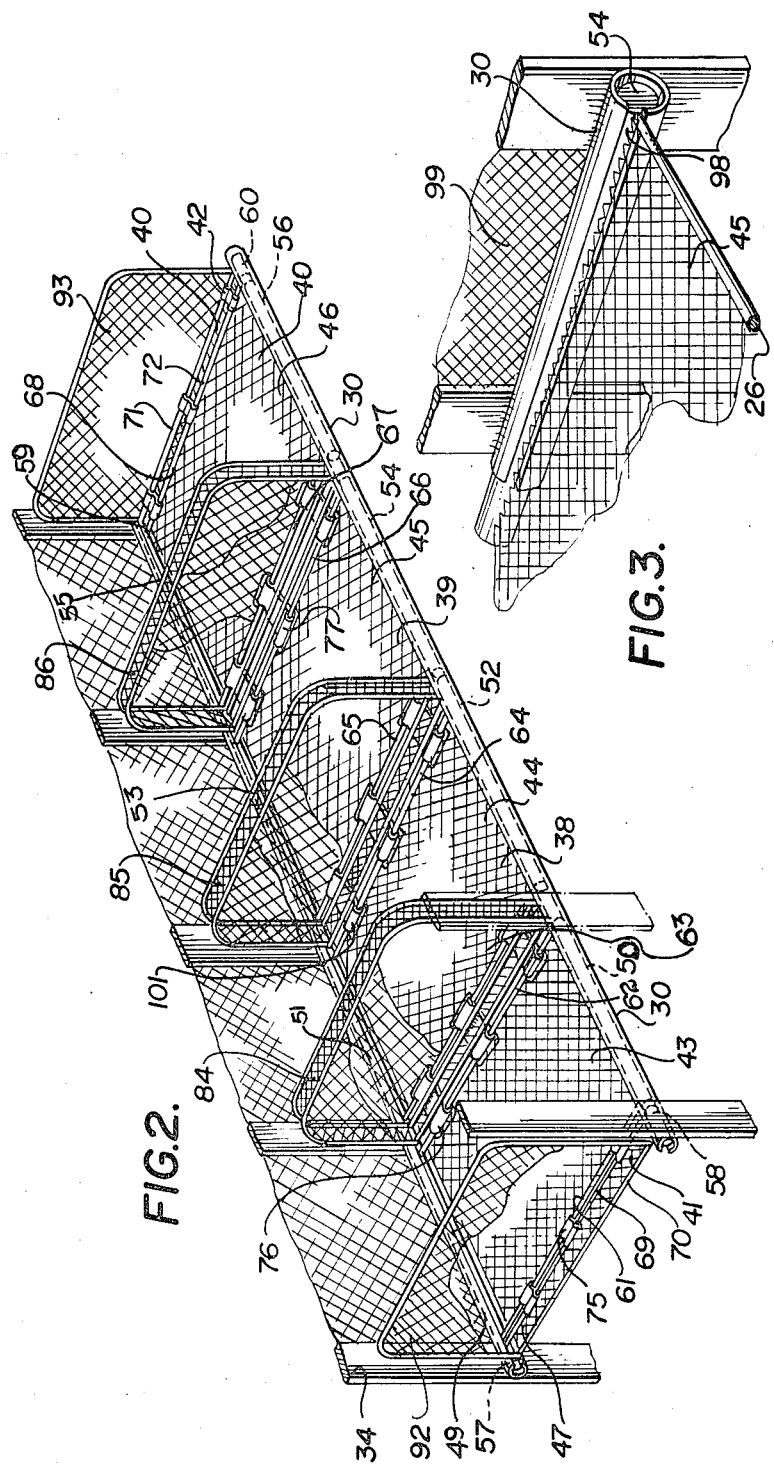

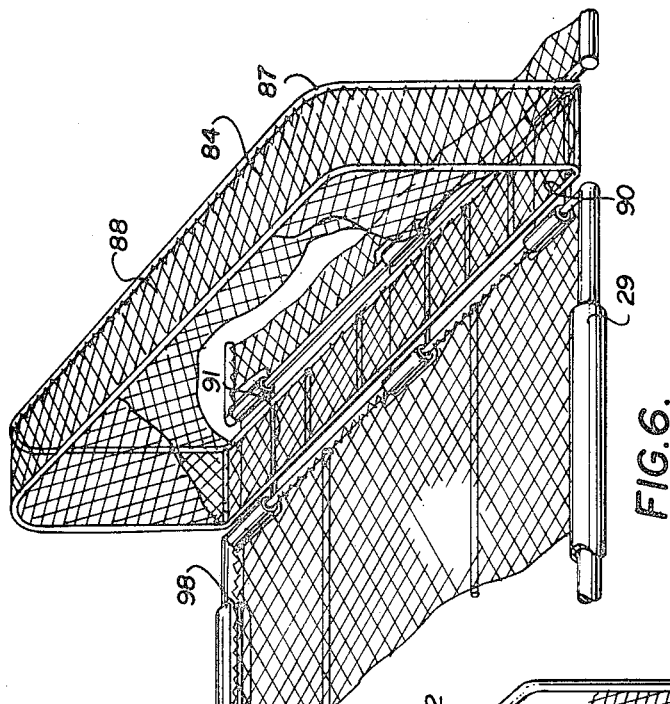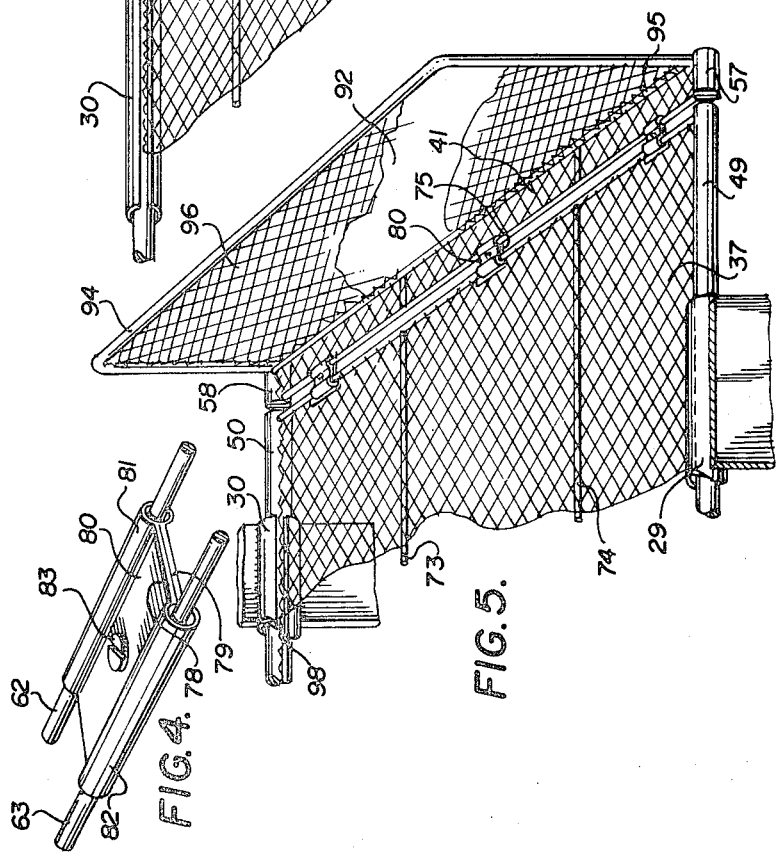

United States Patent Office 3,702,210
Patented Nov. 7, 1972

3,702,210
FOWL CARRIER
Kenneth A. Farrugie, 19 Kensington Ave.,
Brantford, Ontario, Canada
Filed Aug. 3, 1971, Ser. No. 168,580
Claims priority, application Canada, May 20, 1971,
113,522
Int. Cl. A47b 53/00, 7/00, 87/00
U.S. Cl. 312—198                                    6 Claims

ABSTRACT OF THE DISCLOSURE

The invention relates to a slidable fowl carrier adapted to be mounted in rack-style on the transporting vehicle body. Each of the fowl carriers is divided into pivotally attached compartments which extend transversely from one side of the transport vehicle to the other and are slidably supported by horizontal stringer members which, in turn, are supported on vertical upright members resting on the transport vehicle. Each compartment of the carrier is separated from the adjoining compartment by a partition preferably covered by metallic screening material.

---

This invention relates in general to a fowl carrier which permits easier, faster and cheaper means of loading and unloading the fowl from a transport vehicle and is specifically related to a fowl carrier adapted to be mounted on a transport vehicle body with a plurality of similar carriers.

Further to this invention, each of the fowl carriers is divided into pivotally attached compartments which extend transversely from one side of the transport vehicle to the other and are slidably supported by horizontal stringer members which, in turn, are supported a vertical upright members resting on the transport vehicle body.

At the present time, individual wooden cages are stacked in rows of four abreast on the transport vehicle body. When such a method is used, the practice at a destination, is to remove the outside cages and the ones behind these individually all along one side of the vehicle and then, turn the truck around so that the two remaining rows of cages may be removed in a similar manner from the other side. This method is laborious and results in lost man-hours.

U.S. Pat. No. 2,896,996 which issued on July 28, 1959, to Atwater et al., describes a fowl transporter having a bottom base member which is separable into two transversely movable sections. Though this latter invention permits access to the middle fowl cages for feeding etc., the handlers must remove the individual cages one by one.

U.S. Pat. No. 3,173,564 which issued on Mar. 16, 1965 to Mayo discloses a compartment truck having flexible conveyors running longitudinally along a framework on a truck body. Cages are formed on the conveyor at spaced intervals by resiliently supported partition walls. This compartment truck is not only expensive to buy and operate but also requires very sophisticated equipment.

It is therefore a principal object of this invention to provide a slidable fowl carrier adapted to be mounted in rack-style on a vehicle body. This invention is distinguished from prior art devices in that, in the latter, individual cages were used in stacks or rows or required sophisticated and expensive equipment. The prior art does not disclose any slidable carriers whose sections are pivotally attached to each other and which permit loading or unloading of the fowl from either side of the transporting vehicle.

Apart from providing the above object and advantages, the invention prevents overcrowding and bunching of fowl in the carriers and also permits air circulation between the carriers. The fowl carrier pursant to this invention is also simple to construct and cheaply maintained.

In accordance with the invention, there is provided a fowl carrier adapted to be mounted on a transport vehicle body with a plurality of similar carriers. Each of the carriers is comprised of inner and outer horizontal sections pivotally attached to each other by a hinge which supports, between the inner sections, an upwardly extending partition. The other section include an upwardly extending closure on each of their outward ends. All the carriers are slidably supported by a stringer extending along the carrier length on each side thereof. Vertical upright members resting on the transport vehicle body support the stringers. The preferred embodiment of the invention which is hereinafter described also includes tubular stringers having a horizontally extending slot through which a member of each carrier section may slidably engage therethrough with the stringers. Also, wire mesh is usually provided between the vertical upright members.

Other objects and advantages of the invention will become apparent upon reading the following detailed description and upon reference to the drawings, of which:

FIG. 2 is a fragmentary and exploded isometric view of one fowl carrier according to the present invention.

FIG. 3 is a cross-sectional fragmentary and exploded view of the slidable fowl carrier along lines 4—4 of FIG. 2.

FIG. 4 is an enlarged isometric view of the type of hinges used between the series of sections in each unit of the slidable fowl carrier apparatus according to the present invention.

FIG. 5 is an enlarged fragmentary isometric view of the outside closures of a carrier of the slidable fowl carrier apparatus according to the present invention, said carrier partially removed from the stringers.

FIG. 6 is an enlarged view of the wire partition of a preferred embodiment between the sections of the slidable fowl carrier apparatus according to the present invention.

FIG. 7 is on the same page of drawings as FIG. 1.

Figure 1:
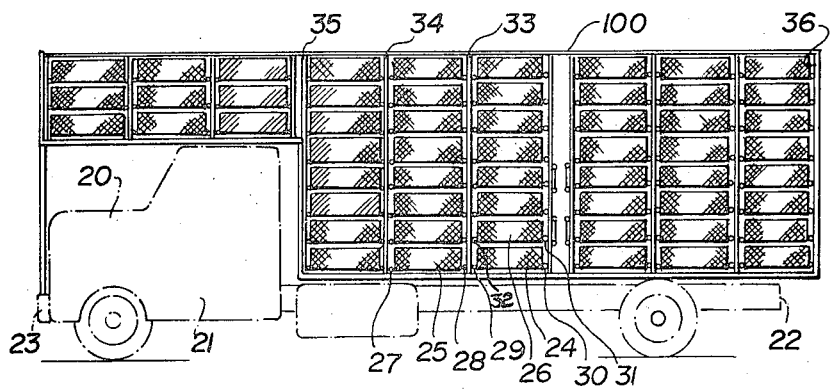
FIG. 1 is a side elevational view of an exemplary mobile transporting vehicle incorporating a plurality of transversely extending slidable fowl carriers according to the present invention.

As illustrated in FIG. 1, the slidable fowl carrier apparatus is adapted to be preferably mounted on a truck 20 behind and above a cab section 21 and supported by a truck body 22 and 23.

Figure 7:
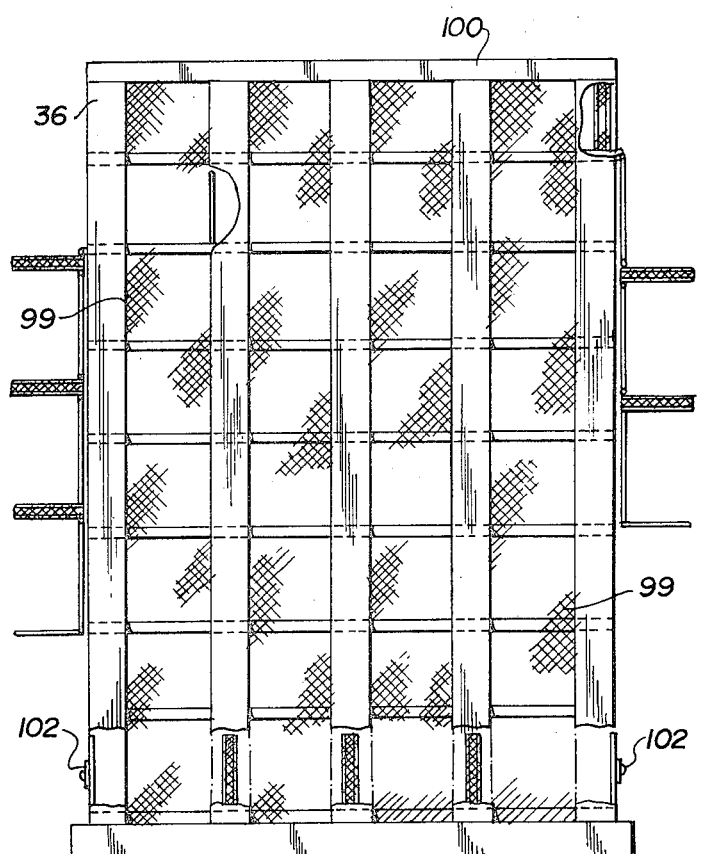
FIG. 7 is a fragmentary rear-elevational view of an examplary mobile transporting vehicle showing transporting, loading and unloading positions of the carriers according to the present invention.

As seen in FIGS. 1 and 7, the carrier apparatus is comprised, in its preferred embodiment, of a plurality of carriers 24, 25 and 26 slidably supported by horizontally extending parallel stringers 27, 28, 29, 30, 31 and 32 extending along each carrier on each side thereof. The stringers are in turn secured to a number of vertically extending upright members 33, 34, 35 and 36 which are supported by the truck body 22 and 23.

Though it is realized that many different types of materials may be used to construct an embodiment of this invention, the preferred embodiment of the fowl carrier which is described therein consists of metallic members of different shapes and sizes.

As illustrated in FIGS. 2 and 3 the preferred embodiment of each fowl carrier consists of a number of inner sections 37, 38, 39 and 40 and outer sections 41 and 42. Each of these inner and outer sections consists respectively of a base 43, 44, 45, and 46 having a frame of two elongated side members 49, 50, 51, 52, 53, 54, 55, 56, 57, 58, 59, and 60 and two end members 61, 62, 63, 64, 65, 66, 67, 68, 69, 70, 71 and 72. If greater base stability of carrier rigidity is required, stiffener members 73 and 74 can be provided between the sections and members. As indicated in FIG. 5 these stiffeners can be inserted to further support the base.

The section base 43, 44, 45 and 46 which is preferably of a metallic screening material such as "chicken wire" is secured to the base frame by welding or other means known in the art. Also, the base, end and side members are preferably circular in cross-section.

Each carrier section 37, 38, 39, 40, 41 and 42 is pivotally attached to the adjoining section by one or more hinges of the type shown at 75, 76 and 77 in FIG. 2. The hinge 76 and 77 is detailed in FIG. 4. In its preferred embodiment, each hinge 75, 76 or 77 consist of two symmetrical members 78 and 79. Each member 78 and 79 consist of a flat central portion 80 and a semi-circular lip 81 and 82 on each side of the hinge. It is realized that for easy and proper pivotal action of each carrier section, the radius of the inside diameter of the area formed when the members 78 and 79 are installed on the carrier must be greater than one-half of the diameter of the base end members 61, 62, 63, 64, 65, 66, 67, 68, 69, 70, 71 and 72. The two hinge members 78 and 79 are secured together by a nut and bolt assembly 83 at the center of the members 78 and 79 or by other means known in the art. In its preferred embodiment, three hinge units are provided between each adjoining section.

Each hinge 76 or 77 which pivotally secures inner sections 37, 38, 39 and 40 to an adjoining inner section supports an upwardly extending partition 84 and 85 as shown in FIG. 2. As illustrated in FIG. 6, the partitions 84, 85 and 86 consist in the preferred embodiment of a wire box-like frame 87 covered with a wire mesh or screening 88 which is conveniently welded to the frame 87. The frame 87 in its preferred embodiment is welded to the hinges at locations 89, 90 and 91. As illustrated in FIGS. 1 and 2, the vertical height of the partitions 84, 85 and 86 is such that in position on the truck, the partitions on the lower carrier 24 extend to a height below the base 37 of the upper carrier 26. The width of the partitions is also such that, once installed, the partition sides not bear against nor strike the horizontally extending stringer or vertical upright members. These side requirements are required in order that the partitions may move within the area between the lower and upper carriers and side members when the carrier is slid along the stringers.

The box-like screen covered partitions are useful since they prevent bunching and overcrowding of the fowl during transit and they also permit air circulation between the adjoining sections and carriers.

As shown in FIG. 5, the outer closures 92 and 93 consist in their preferred embodiment, of a rectangular frame 94 and 95 covered with a metallic screen 96 and extending horizontally between the base sides 57 and 58 and vertically from the base 47 to below the base of the carrier next above the carrier to which the closure is secured. It is also noted that the hinges 75, pivotally securing the outer section 41 to the inner section 37 of the carrier 24, have a shorter flat portion 80 since there is no box-like partition supported on it as on hinges 76 and 77.

For transportation of the fowl in cold climates, the metallic screening 96 on the outer closures 92 and 93 can be easily replaced by a sheet-type material to prevent cold air from blowing through the carriers. This can also be done by replacing the outer sections completely.

As illustrated in FIGS. 1, 2, 3, 5 and 6 the fowl carriers are slidably supported by horizontally extending parallel stringers 27, 28, 29, 30, 31 and 32 extending along each carrier on each side thereof. The stringers extend from one side of the truck 20 to the other. In its preferred embodiment the stringers are circular metal pipes having on a side facing the carrier, a slot 97 or 98 extending horizontally throughout its length. This slot is of such a size as to permit the carrier base 37, 38, 39, 40, 41 and 42 and base ends 61 to 72 to slidably move along the stringer. It is noted that ends 61 to 72 may if required, be tapered so that they will slide within the slots 97 and 98. Also, in its preferred embodiment, the base 43 to 46 does not touch or come in contact with the stringers.

The stringers are secured preferably by welding or by other methods known in the art to a plurality of vertical upright members 33, 34, 35 and 36 which rest on the truck body 22 and 23. In order to prevent the fowl in the carriers from moving from one carrier to another carrier at the same height but in a different vertical arranged series of carriers, metallic screening 99 is provided between the vertical upright members supporting superimposed parallel stringers such as 29 and 32 and 30 and 31.

In order to prevent the fowl from escaping from the uppermost carriers, a roof 100 is provided. This roof, which is preferably of a metallic screening material, is supported by vertical upright members 33, 34, 35, and 36 and other similar members spaced in checkerboard fashion across the truck body 22 and 23. In cold or bad weather, a tarpaulin is usually draped over the top of the transport vehicle.

FIG. 7 also shows the carriers in a position for loading and unloading the fowl.

In operation, the fowl carrier apparatus consisting of a plurality of individual fowl carriers is arranged in both vertical and horizontal arrangements transversely on a truck body. When it is desired to empty the carriers of fowl, the carrier 25 is pulled out along the stringers 27 and 28 to permit the outer sections 47 with its closure 92 to pivot downwardly thereby permitting a fowl handler to reach in and remove the fowl. The carrier 25 is then slid further forward to the side of the truck to a position when the partition 84 can be pivoted downwardly and permitted to hang by hinges 76, thereby permitting removal of fowl from section 38. When this is completed, the section 38 and partition 85 is pulled out of the stringers 29 and 30 and permitted to hang down along the side of the truck 20 by hinges 101. The same procedure is followed until all four sections have been emptied. Once emptied, the sections are merely slid back into their original location on the tubular stringers 29 and 30 and the process is repeated for the other carriers. To load the carriers, the carrier with the exception of one section is pulled free of the truck and permitted to hang down along the side of the truck and the reverse method described above is followed.

As illustrated in FIG. 7, it has been demonstrated that the carrier will not fall out of the stringers even when all but one of the carrier sections are hanging along the side of the truck and held only by one section which is supported by the stringers. During transportation of the fowl, the carriers are held in location on the stringers by means of a turn bar 102 or other locking devices known in the art.

It is also seen that cleaning of the carrier can be quickly and easily completed since fowl manure can be picked up off the truck box and the metallic screening of the other components need only be brushed clean.

While the invention has been described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

I claim:

1. In a fowl carrier adapted to be mounted on a vehicle body, a transversely slidable carrier comprised of outer and inner horizontal sections pivotally attached to each other by a hinge supporting, between the inner sections an upward extending partition, said outer sections including on each outward end an upwardly extending closure, said sections being slidably supported on a stringer extending along the carrier length on each side thereof, said stringers attached to a number of upright members resting on the vehicle body.

2. A fowl carrier as claimed in claim 1 wherein the sections and partitions include metallic screening material.

3. A fowl carrier apparatus as claimed in claim 2 in which each of the sections includes a base which comprises two sides and two end members, said side members being tubular in cross-section and inserted within tubular stringers on each side of the carrier, said stringers having an inner diameter larger than the outside diameter of the base sides and having a horizontally extending slot throughout its length to permit said base sides to slide therein.

4. A fowl carrier apparatus as claimed in claim 3 in which a metallic screening material is provided between the said upright members.

5. A fowl carrier as claimed in claim 3 in which locking means are provided to hold the carriers in place during transportation thereof.

6. A fowl carrier as claimed in claim 3 in which the said outer sections include an upwardly extending closure covered with a sheet-like material.

References Cited

UNITED STATES PATENTS

| | | | |
|---|---|---|---|
| 1,011,112 | 12/1911 | Burlingame | 312—131 |
| 2,510,759 | 6/1950 | Schnewind | 312—312 X |
| 2,896,996 | 7/1959 | Atwater et al. | 296—3 |
| 3,173,564 | 3/1965 | Mayo | 214—522 |

PAUL R. GILLIAM Primary Examiner

U.S. Cl. X.R.

296—3